(12) United States Patent
Cattoor et al.

(10) Patent No.: US 12,104,681 B2
(45) Date of Patent: Oct. 1, 2024

(54) FOUR SPEED COUNTERSHAFT TRANSMISSION

(71) Applicant: Dana Belgium N.V., Flanders (BE)

(72) Inventors: Kurt Cattoor, Koolkerke (BE); Filip D. Schacht, Meulebeke (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/152,417

(22) Filed: Jan. 10, 2023

(65) Prior Publication Data

US 2024/0229900 A1    Jul. 11, 2024

(51) Int. Cl.
*F16H 3/093*    (2006.01)
*B60K 1/00*    (2006.01)
(Continued)

(52) U.S. Cl.
CPC ............... *F16H 3/093* (2013.01); *B60K 1/00* (2013.01); *B60K 1/02* (2013.01); *B60K 17/08* (2013.01);
(Continued)

(58) Field of Classification Search
CPC .......... F16H 3/093; F16H 3/085; F16H 57/02; F16H 2003/0818; F16H 2057/02026; F16H 2057/02034; F16H 2057/02043; F16H 2200/0021; F16H 2200/0043; F16H 37/043; F16H 2003/0936; F16H 2037/045; F16H 2048/364; B60K 1/00; B60K 1/02; B60K 17/08
See application file for complete search history.

(56) References Cited

U.S. PATENT DOCUMENTS 8,596,157 B2    12/2013    Vu
2002/0189397 A1*    12/2002    Sakamoto ............. B60W 10/10
74/661
(Continued)

FOREIGN PATENT DOCUMENTS

CN    215806071 U    2/2022
DE    102014200191 A1 *    7/2015    ............. F16H 39/02
(Continued)

OTHER PUBLICATIONS

English Translation of Sjolander DE 102014200191 A1 (Year: 2015).*
(Continued)

*Primary Examiner* — Victor L MacArthur
(74) *Attorney, Agent, or Firm* — McCoy Russell LLP (57) ABSTRACT

Methods and systems for a multi-ratio gear box and four speed transmission are provided. In one example, a first shaft is coupled to one or more input speed reduction gear sets. A second shaft is coupled to a multi-range clutch having a first position and a second position allowing for two speeds. A third shaft is coupled to a low-speed clutch and a fourth shaft is coupled to a high-speed clutch, together doubling the number of speeds. The high and low-speed clutches provide a large gear spread that allow the multi-range clutches to have a reduced gear spread, overall reducing the required size of the transmission. A fifth shaft, coupled to the fourth shaft via a gear, may be an output shaft spaced away from the electric motors, thereby creating a short flange to flange distance.

20 Claims, 6 Drawing Sheets

(51) Int. Cl.
*B60K 1/02* (2006.01)
*B60K 17/08* (2006.01)
*F16H 3/085* (2006.01)
*F16H 57/02* (2012.01)
*F16H 3/08* (2006.01)

(52) U.S. Cl.
CPC ............. *F16H 3/085* (2013.01); *F16H 57/02* (2013.01); *F16H 2003/0818* (2013.01); *F16H 2057/02026* (2013.01); *F16H 2057/02034* (2013.01); *F16H 2057/02043* (2013.01); *F16H 2200/0021* (2013.01); *F16H 2200/0043* (2013.01)

(56) References Cited

U.S. PATENT DOCUMENTS

| | | | |
|---|---|---|---|
| 2011/0251764 A1* | 10/2011 | Iwase | B60K 6/445 |
| | | | 701/54 |
| 2019/0063557 A1* | 2/2019 | Cattoor | F16H 3/093 |
| 2020/0392877 A1* | 12/2020 | Hori | F16H 57/0435 |
| 2021/0379978 A1* | 12/2021 | Van Dingenen | B60K 25/06 |

FOREIGN PATENT DOCUMENTS

| | | | |
|---|---|---|---|
| EP | 2243983 B1 | 8/2012 | |
| EP | 3501870 A1 * | 6/2019 | ............... B60K 1/02 |
| WO | WO-2021145100 A1 * | 7/2021 | |

OTHER PUBLICATIONS

English Translation of Gluck EP 3501870 A1 (Year: 2019).*
English Translation of Takeda WO 2021145100 (Year: 2021).*

* cited by examiner

Shift strategy

| Gear/clutch | L | H | 1 | 2 |
|---|---|---|---|---|
| 1 | x |  | x |  |
| 2 | x |  |  | x |
| 3 |  | x | x |  |
| 4 |  | x |  | x |

FOUR SPEED COUNTERSHAFT TRANSMISSION

TECHNICAL FIELD

The present disclosure relates generally to transmissions, more specifically to symmetric four speed transmissions for electric vehicles.

BACKGROUND AND SUMMARY

Vehicles may include a transmission for a controlling power generated by the engine. The transmission may include one or more shafts and gears which may engage or disengage with one another based on a selected gear ratio.

Multi-speed power-shift transmissions of the countershaft type may include a pair of friction and associated gears operatively assembled on a speed clutch shaft. The speed clutch shaft is supported adjacent to its ends by bearings carried in end walls of a transmission housing. Power input to the shaft, in transmissions having an equal number of forward and reverse speed ratios, is provided by forward and reverse clutches assembled on an input shaft that is also supported by bearings in the housing end walls. A gear on the forward clutch adjacent to one housing end wall drives a gear on the speed clutch shaft and a gear on the reverse clutch adjacent to the other housing end wall drives through a reverse idler gear to another gear on the speed clutch shaft. The reverse idler gear is carried on its own countershaft. The speed clutch shaft can therefore be driven in either a forward or reverse direction by alternately engaging the forward and reverse clutches. The pair of speed ratio clutches each has a drive gear that meshes, in ratio-determining relationship, with a respective driven gear on a power output shaft. Since the pitch diameters of the speed ratio gears are chosen different for the two speed clutches, two output shaft speeds are selectively available.

The inventors have recognized various issues with such an approach. For example, if more than two speed ratios are required, such as four speeds in each direction, additional speed clutch shafts along with additional bearings, gears and the necessary fluid pressure transfer systems can be provided. The additional number of components such as gears, shafts and bearings as well as the increased complexity and size of the housing in providing additional bearing bores and pressure fluid manifolds and passages can lead to an overly large package, as well as increased weight, just to name some of the issues. Large packages such as described may not be suitable for particular vehicle platforms, for example those vehicle platforms that demand a small distance between output interfaces (e.g., flanges) for installation.

In one embodiment, the approaches disclosed herein provide a system for a multi-ratio gearbox, comprising first shaft coupled to one or more input speed reduction gear sets, a second shaft coupled to a multi-range clutch, a third shaft coupled to a low-speed clutch, a fourth shaft coupled to a high-speed clutch, and a fifth shaft coupled to output interfaces. In an example, the shafts, gears, and clutches described herein allow for four speed ratios with a relatively large spread between the high-speed clutch and the low-speed clutch while maintaining reduced gear spread between the multi-range clutch positions. This reduced gear spread between the multi-range clutch positions may provide for more equal (and relatively smaller) gear sizes and lower gear/shaft speeds.

Further, the fifth shaft, as an output shaft, is spaced away from the fourth shaft by a gear that couples the fifth shaft to the fourth shaft. Spacing the fifth shaft away from the other shafts allows for a short distance between output interfaces as compared to a distance between output interfaces when the output interfaces are coupled to a shaft that also couples to a clutch. The short distance between output interfaces allows for use of the transmission in vehicle platforms that demand a short distance for installation. Overall, the transmission, with the layout provided, is reduced in size which advantageously allows for the transmission to be used in small installation spaces.

Further, the one or more input speed reduction gear sets included in the transmission allow for reduced output speeds and reduced speeds of the second, third, and fourth shafts. Reduced speeds in turn reduces load levels circulating through the multi-ratio gearbox. Lower load levels result in components being smaller sized and thus more compact for an overall reduced size of the transmission.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A multi-speed transmission system with two or more selectable different gear ratios is described herein. In one embodiment, the transmission system may be a four speed transmission including a multi-ratio gearbox. Further, the transmission system may be a countershaft power-shift transmission. A compact layout of a plurality of shafts, gears, and clutches in the system allows the system to achieve greater gear ratio selection without unduly impacting the system's space efficiency. Addition of a gear to space away an output shaft from other gears and shafts may allow for integration into vehicle platforms that demand a long drop and a short distance between output interfaces. Additional clutches are designed to modify the system's power path to add additional available speeds.

In one embodiment, the systems disclosed herein provide a transmission housing comprising a symmetric four speed schematic with an equal number of forward and reverse driving gears. A first shaft of the plurality of shafts may be coupled to one or more input speed reduction gear sets. A second shaft of the plurality of shafts may be coupled to a multi-range clutch. A third shaft of the plurality of shafts may be coupled to a low-speed clutch. A fourth shaft of the plurality of shafts may be coupled to a high-speed clutch. A fifth shaft of the plurality of shafts may be coupled to at least two output interfaces. A gear coupling the fourth shaft to the fifth shaft spaces the fifth shaft away from the fourth gear. The transmission system may embody three sections, the first being input reduction gear set(s), the second being the multi-range clutch, and the third being the low-speed and high-speed clutch. This may provide a high/low range shift which reduces a needed gear spread in the second section of the gearbox. A reduced spread requirement may result in more equal gear sizes and lower gear/shaft speeds. With four speeds available, an additional gear set coupled to the fourth gear may be added to increase the drop. With the long drop, the output shaft may be shortened, thereby creating a short distance between output interfaces as compared to gearboxes in which output interfaces are coupled to a shaft that includes a clutch. Small gear sizes are evidently beneficial for the overall required installation space. Increased drop is beneficial for particular vehicle platforms that demand a short flange to flange distance for installation.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
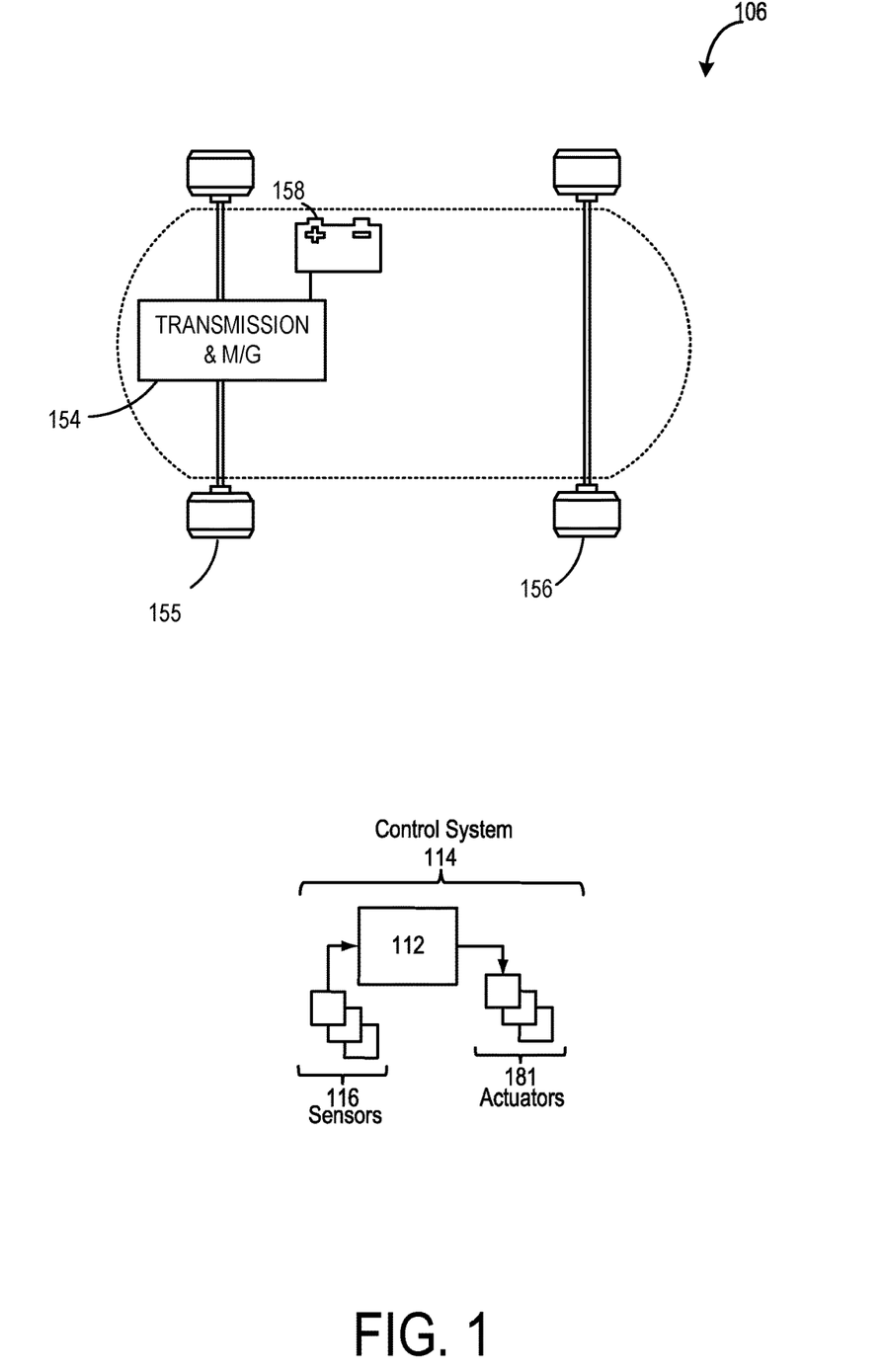
FIG. 1 shows a schematic of an exemplary vehicle.

Turning now to the figures, FIG. 1 shows a schematic depiction of a vehicle system 106 that can derive propulsion power from an electric motor 154 (e.g., a drive motor). In one embodiment, electric motor 154 may be a traction motor. Electric motor 154 receives electrical power from a traction battery 158 to provide torque to rear vehicle wheels 155. Electric motor 154 may also be operated as a generator to provide electrical power to charge traction battery 158, for example, during a braking operation. It should be appreciated that while FIG. 1 depicts an electric motor 154 mounted in a rear wheel drive configuration, other configurations are possible, such as employing electric motor 154 in a front wheel configuration, or in a configuration in which there is an electric motor mounted to both the rear vehicle wheels 155 and front vehicle wheels 156.

Electric motor 154 may include a gearbox integrated therein (to be described further herein). Additionally or alternatively, the electric motor 154 may be coupled to an outside of a transmission/gearbox housing. The integrated gearbox may include one or more input speed reduction gear sets. Electric motor 154 may also include at least one clutch. Controller 112 may send a signal to an actuator of the clutch(es) to engage or disengage the clutch(es), so as to couple or decouple power transmission from the electric motor 154 to the rear vehicle wheels 155 or the front vehicle wheels 156. Additionally or alternatively, there may be multiple traction batteries configured to provide power to different driven wheels, wherein power to the wheels may be predicated based on traction at the wheels, driver demand, and other conditions. In one example, the vehicle system 106 includes a symmetric four speed schematic wherein there are an equal number of forward and reverse drive speeds.

Controller 112 may form a portion of a control system 114. Control system 114 is shown receiving information from a plurality of sensors 116 and sending control signals to a plurality of actuators 181. As one example, sensors 116 may include sensors such as a battery level sensor, clutch activation sensor, etc. As another example, the actuators may include the clutch, etc. The controller 112 may receive input data from the various sensors, process the input data, and trigger the actuators in response to the processed input data based on instruction or code programmed therein corresponding to one or more routines.

Figure 2A:
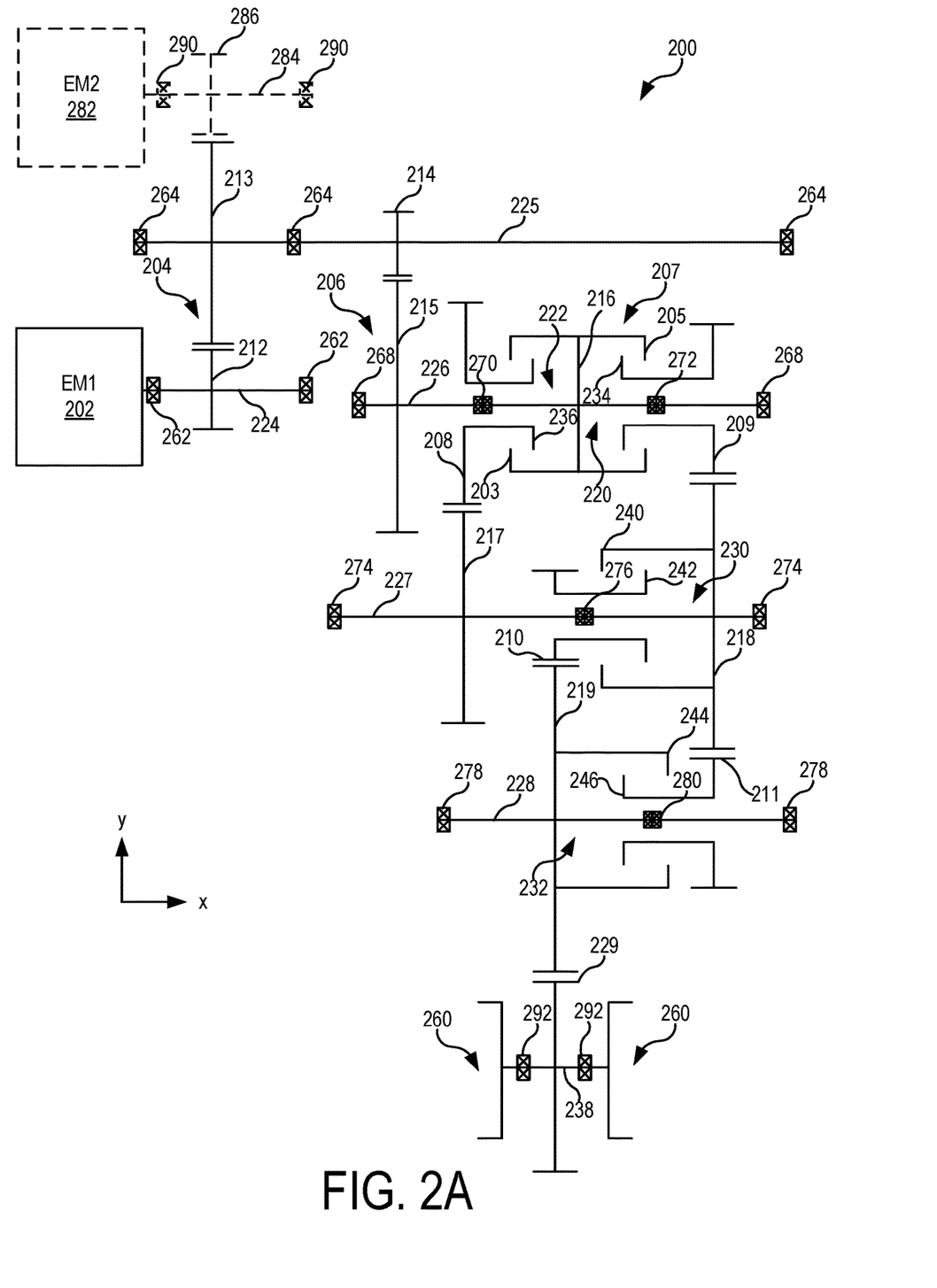
FIG. 2A shows a schematic of a four speed transmission system.
Figure 2B:
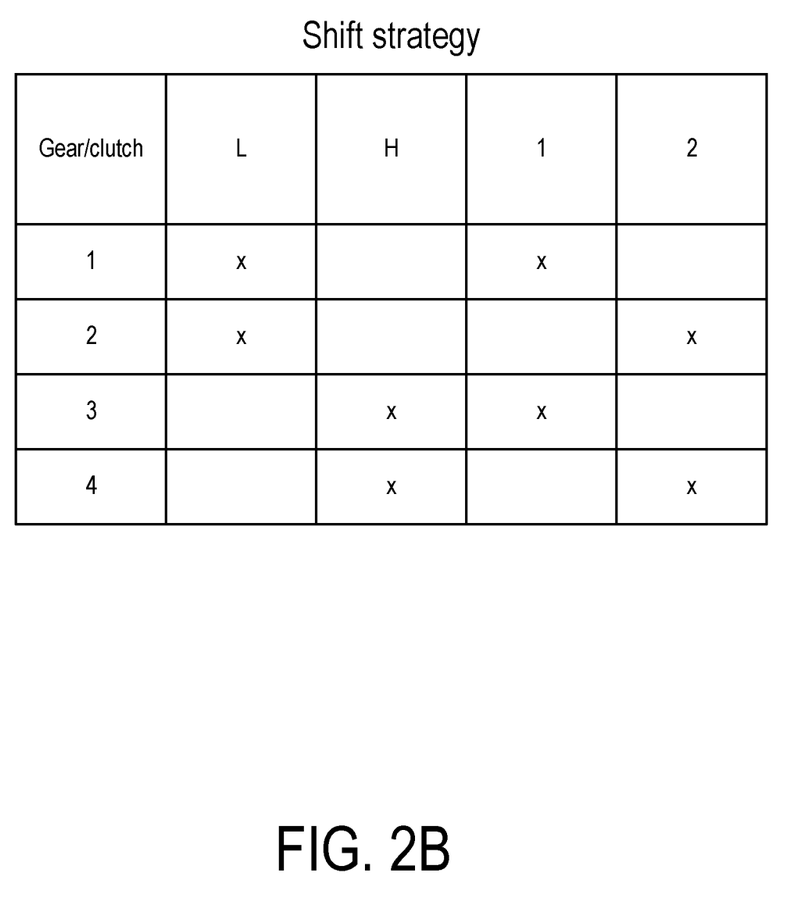
FIG. 2B shows a shift strategy for the four speed transmission system.

Referring now to FIG. 2A, a diagram of an exemplary transmission system 200 is shown. A shift strategy for a multi-ratio gear box of the transmission system 200 is depicted in FIG. 2B. For reference, an axis system is provided in FIG. 2A as well as FIGS. 3A-D. The y-axis may be a vertical axis (e.g., parallel to a gravitational axis) and/or the x-axis may be a lateral axis (e.g., horizontal axis). However, the axes may have other orientations, in other examples.

There may be a total of four gear/clutch ratios corresponding to the four optional speeds of the transmission system 200. A first configuration of the system, denoted as gear/clutch 1 in FIG. 2B, includes a multi-range clutch 207 in a first position 220 and a low-speed clutch 230 engaged. A second configuration of the system, denoted as gear/clutch 2 in FIG. 2B, includes the multi-range clutch 207 in a second position 222 and the low-speed clutch 230 engaged. A third configuration of the system, denoted as gear/clutch 3 in FIG. 2B, includes the multi-range clutch 207 in the first position 220 and a high-speed clutch 232 engaged. A fourth configuration of the system, denoted as gear/clutch ratio 4 in FIG. 2B, includes the multi-range clutch 207 in the second position 222 and the high-speed clutch 232 engaged.

In one embodiment, the multi-range clutch 207 may comprise friction clutches and the high-speed clutch 232 and the low-speed clutch 230 may also be friction clutches. Friction clutches, as described herein may include two sets of plates designed to frictionally engage and disengage one another when the clutch is opened and closed. The multi-range clutch 207 therefore includes four sets of friction plates, two for each of the available positions. For example, a clutch plate 234 and a clutch plate 205 may be engaged when the multi-range clutch 207 is in the first position 220. Friction clutches may provide for smooth engagement of clutches during shifting operations. In this way, the transmission is capable of efficiently powershifting between the four operating gears. As such, power interruptions may be reduced, thereby enhancing transmission performance and customer appeal.

Electric motor 202 (e.g., electric motor 154 from FIG. 1) may be coupled to an input side of shaft 224. In some examples, shaft 224 may be a rotor shaft that couples the electric motor 202 to other components of the transmission system 200, thereby converting power from the electric motor 202 into rotational power usable by the transmission. In one embodiment, electric motor 202 may be an electric traction motor. The shaft 224 receives power from the electric motor 202 and the shaft 224 in turn transfers power to downstream components. Specifically, shaft 224 may be rotationally coupled to gear 212, which in turn may be coupled to gear 213. Bearings 262, located at either end of shaft 224, may support and facilitate rotation of the shaft 224. Gear 213 may be further coupled to input side of an input shaft 225. A set of gears and shafts including gear 212, gear 213, and input shaft 225 may comprise a first input speed reduction gear set 204, which may be a first half of the first section of the gearbox.

The output side of input shaft 225 may be further coupled to gear 214. Bearings 264, located at either end of input shaft 225 and between gear 213 and 214 in the axis of input shaft 225, may support and facilitate rotation of the input shaft 225. Gear 214 may be further coupled to gear 215 which may be coupled to shaft 226. A second set of gears and shafts, including gear 214, gear 215, and shaft 226 may comprise a second input speed reduction gear set 206, which may be a second half of the first section of the gearbox. In some embodiments, input shaft 225 may be the first shaft of the multi-ratio gear box referred to above. Input shaft 225 may extend through both gears 213 and 214. Gears 213 and 214 may be parallel to each other and coaxial with each other and the input shaft 225.

The electric motor 202 may run at relatively higher speeds compared to a combustion engine and the speeds may be reduced before entering the transmission system 200. Due to the high transmission torques and loads, bearings of a relatively larger size may be required but these larger bearings may not be able to accept the high speeds produced by the electric motor 202. The first input speed reduction gear set 204 and the second input speed reduction gear set 206 may reduce the input speed from the electric motor 202 to a speed acceptable by larger bearings. Thus, the transmission system 200 allows for bearings that allow for high transmission torques and loads, increasing the overall usability of the transmission system 200 and allowing for components therein to be smaller sized for a similar high power level.

One embodiment of a method for an input reduction gear set is described. A drive input shaft (e.g. shaft 224) rotates at an input speed. When two shift elements of the reduction gear set are engaged (for example, closed in accordance with the shift logic of the gearbox) the output shaft of the reduction gear set (e.g. input shaft 225) rotates at an output speed. The output speed may be lower than the input speed, thus allowing for the input speed to be high without causing the output speed to be high.

The second section of the gearbox may comprise the second shaft (e.g., shaft 226) and the multi-range clutch 207. The multi-range clutch 207 may allow for two different speeds of the transmission system 200. In some embodiments, the multi-range clutch 207 may include the first position 220 coupling the second shaft (e.g., shaft 226) to the third shaft (e.g., shaft 227) via a low gear and the second position 222 coupling the second shaft to the third shaft via a high gear. The first position 220, when engaged, may be the low gear and the second position 222, when engaged, may be the high gear.

In some examples, shaft 226 may be rotationally coupled to a gear 216, the gear 216 further coupled to the multi-range clutch 207. Bearings 268, located at either end of shaft 226, may support and facilitate rotation of the shaft 226. Bearings 270 and 272 may further support and facilitate rotation of the shaft 226. Bearings 270 and 272 may be located at either side of gear 216, as shown in FIG. 2A. The multi-range clutch 207 may be comprised of a set of parallel shafts containing two sets o friction clutch plates and two gears. Each of the parallel shafts may include or otherwise be coupled to a clutch plate. For example, clutch plate 236 and clutch plate 203 may be engaged when the multi-range clutch 207 is in the second position 222. Clutch plate 234 and clutch plate 205 may be engaged when the multi-range clutch 207 is in the first position 220. Clutch plates 234 and 236 may be coupled to gears 209 and 208, respectively. Clutch plates 205 and 203 may be coupled to gear 216. First position 220 may be engaged when gear 216 is shifted by an actuator (not pictured in FIG. 2A) to the left. The second position 222 may be engaged when gear 216 is shifted by an actuator (not pictured in FIG. 2A) to the right.

The multi-range clutch 207 when in the first position 220 may produce a relatively lower speed than when in the second position 222. As such, the first position 220 may be the low gear, as mentioned above, and the second position 222 may be the high gear. Thus, the multi-range clutch 207, with reduced spread between gears coupled to the multi-range clutch 207, is capable of producing two of the four potential speeds of the transmission system 200.

The third section of the gearbox may comprise the low and high-speed clutches which may double the number of speeds of the transmission system 200 in both forward and reverse driving directions, in some embodiments totaling four speeds. Gear 208 of the multi-range clutch 207 may be coupled to gear 217. Gear 217 may be rotationally coupled to shaft 227 and shaft 227 may be further rotationally coupled to gear 218. Gear 209 of the multi-range clutch 207 may also be coupled to gear 218. Bearings 274 may support and facilitate rotation of the shaft 227. Bearings 274 may be located at either end of the shaft 227. Bearings 276 may further support and facilitate rotation of the shaft 227. Bearings 276 may be located along shaft 227 in the vertical axis of the low-speed clutch 230. Gear 218 and gear 217 may be parallel to each other, lying on opposite ends of shaft 227 wherein gear 217 is towards the left with respect to the x-axis and gear 218 is towards the right with respect to the x-axis. The shaft 227 may extend horizontally past both gear 217 and gear 218. The low-speed clutch 230 may be coupled to gear 218 above and below shaft 227. The low-speed clutch 230 may be coupled to gear 219 via gear 210 during conditions in which the low-speed clutch 230 is engaged. When engaged, clutch plates 240 and 242 may be frictionally engaged, in such embodiments in which the low-speed clutch 230 is a friction clutch.

Gear 218 may be further coupled to the high-speed clutch 232 via gear 211 during conditions in which the high-speed clutch 232 is engaged. When engaged, clutch plates 244 and 246 of the high-speed clutch 232 may be frictionally engaged, in such embodiments in which the high-speed clutch is a friction clutch.

Further, high-speed clutch 232 may be fixedly coupled to gear 219 above and below shaft 228. Bearings 278 may support and facilitate the rotation of the shaft 228. Bearings 278 may be located at either end of shaft 228. Bearings 280 may further support and facilitate rotation of shaft 228. Bearings 280 may be located along shaft 228 in the vertical axis of the high-speed clutch 232. Gear 219 may be parallel to gear 218 and gear 217, though it may be positioned vertically below both gears 218 and 217. Shaft 228 may be parallel to output shafts 227, 226, 224, and input shaft 225.

In some examples, gear 219 is coupled to gear 229. Gear 229 may be rotationally coupled to output shaft 238. Output shaft 238 may couple to two output interfaces 260. Output interfaces 260 may be positioned at either end of the output shaft 238. Output interfaces may be, in some examples, flanges, yokes, or the like. Output interfaces 260 may be designed to mechanically attach to downstream driveline components such as shafts, joints, and the like that transfer mechanical power to drive axles (not shown). Bearings 292 installed at either end of the output shaft 238, prior to the position of the output interfaces 260, may support and facilitate rotation of the output shaft 238.

The gear 229 may allow for the output shaft 238 and the output interfaces 260 to be spaced away from components vertically above. Without a clutch coupled to the output shaft 238, as would be if output interfaces 260 were coupled to shaft 228, a distance between the output interfaces 260 may be reduced. A reduced distance between output interfaces 260 may allow for the transmission system 200 to fit vehicle platforms and/or applications that demand a small distance, such as with loader type vehicles.

The second, third, and fourth shafts (e.g., shafts 226, 227, and 228) herein described may be layshafts or speed clutch shafts such that power is inputted not from a source but from another shaft and is outputted not to outputs but to another shaft. For example, the second shaft (e.g., shaft 226) receives power from input shaft 225 via a plurality of gears and transfers power to the third shaft (e.g., shaft 227) via the multi-range clutch 207. As such, the second, third, and fourth shafts provide power transmission through the multi-ratio gearbox, directionality of the power transmission being altered by clutch engagement.

All of the shafts herein described may extend horizontally, parallel to the x-axis and all of the gears herein described may extend vertically, parallel to the y-axis. In some examples, the input shaft 225, shafts 226, 227, 228, and output shaft 238 (e.g., the first, second, third, fourth, and fifth shafts) may extend through the relevant gears or clutches to which they are coupled. In some embodiments, the first shaft (e.g. input shaft 225) may be vertically above the second shaft (e.g. shaft 226), the second shaft may be vertically above the third shaft (e.g. shaft 227), the third shaft may be vertically above the fourth shaft (e.g., shaft 228), and the fourth shaft may be vertically above the fifth shaft (e.g., the output shaft 238) when arranged in a vehicle. The first, second, third, fourth, and fifth shafts herein described may all be parallel to each other, with the fifth shaft vertically below the first, second, third, and fourth shafts. The various shafts being positioned in parallel with one another may provide a desired form factor of the transmission housing. Further, the parallel architecture may enable bearing locations to be more supported throughout the transmission.

All of the clutches herein described (e.g., the multi-range clutch and the low and high-speed clutches) may be oriented vertically where the vertical top of each clutch is above a shaft and the vertical bottom of each clutch is below that same shaft. For example, the low-speed clutch 230 is oriented such that the vertical top of the clutch is above shaft 227 and the vertical bottom of the clutch is below shaft 227 with respect to the vertical axis/gravity when installed in a vehicle positioned on the ground.

FIG. 2A depicts the multi-range clutch in a middle disconnected position. Each of the clutch plates 234, 236, 205, and 203 are depicted as disengaged. In some examples, the middle disconnected position may not be used in practical use of the transmission system 200, but in other examples, the middle disconnected position may represent an idling or neutral position of the transmission.

In alternative examples, the transmission system 200 includes another electric traction motor, such as second electric motor 282. In such examples, the electric motor 202 may be a first electric motor. The second electric motor 282 may be coupled to the transmission system 200 via a shaft 284. Shaft 284, similar to shaft 224, may be a rotor shaft. Bearings 290, located at either end of shaft 284, may support and facilitate rotation of the shaft 284. Shaft 284 may be coupled to a gear 286. The gear 286, similar to gear 212, may be rotationally coupled to gear 213. In such examples in which the second electric motor 282 is included with the transmission system 200, the first input speed reduction gear set 204 may comprise gears 286, 213, and 212 coupled to the input shaft 225. The second electric motor 282 may be positioned vertically above electric motor 202. Shaft 284 may be positioned vertically above shaft 224.

The option for two motors may allow for providing a higher power without having to increase the size of a single motor. It may also be easier to package two relatively smaller motors than a single relatively larger motor. Additionally, the option for a second motor may allow for the second motor to act as a backup in the event of overheating of the first motor. Additionally, having two different input ratios may provide for high speed/low torque and low speed/high torque options.

The shift strategy depicted in FIG. 2B demonstrates the four available configurations of the multi-ratio gearbox, as described in detail above. In these configurations, there may be two clutches engaged for each ratio, wherein the multi-range clutch 207 is in one of the two available positions and either the low-speed clutch or the high-speed clutch is engaged. The neutral positions of the multi-range clutch 207 depicted in the diagram of FIG. 2A may not be used in operation in any of these ratios. Additionally, in operation of the transmission system 200, at least one of the low-speed clutch 230 or the high-speed clutch 232 may be engaged. Therefore, the transmission system 200 is capable of four speeds in both reverse and forwards directions via three clutches—the multi-range clutch 207, the low-speed clutch 230, and the high-speed clutch 232.

In some examples, the transmission system 200 may embody an overlap shifting method. For example, when upshifting from the first configuration of the system to the second configuration of the system, pressure on clutch plates 205 and 234, which are engaged in the first position 220, may decrease at the same time as the pressure on the clutch plates 203 and 236, which are engaged in the second position 222, increases. Further examples of a shifting scenario are described with reference to FIG. 5. An overlapping shifting method as herein described may reduce power interruptions due to shifting and increase smoothness.

The layout of the second section (the multi-range clutch 207) of the multi-ratio gearbox herein described is such that there is a reduced gear spread between the first position and the second position. This reduced gear spread may result in more equal and smaller gear sizes than would be used with a larger gear spread. In turn, this may produce lower gear/shaft speeds which may avoid the presence of too high of shaft and clutch speeds. Too high of shaft and clutch speeds may become an issue with regard to the size of the bearings needed. As noted above, relatively larger bearings, as would be demanded in one embodiment of the present disclosure due to high power loads, do not allow high speeds. The reduced output speeds via the input speed reduction gear sets allows for the relatively larger bearings. A further reduction in output speed may be achieved when the low-speed clutch 230 is engaged, which may also reduce the load levels circulating through the gearbox. Lower load on the components therein may allow for smaller sized components for a similar high power level. Smaller sized components is evidently beneficial as they demand a relatively smaller envelope for the transmission.

Figure 3A:
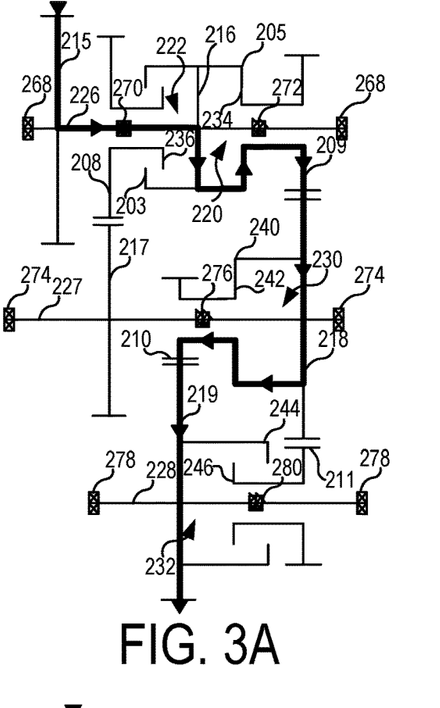
FIG. 3A shows a schematic of the four speed transmission system in a first gear/clutch ratio and a power path thereof.
Figure 3B:
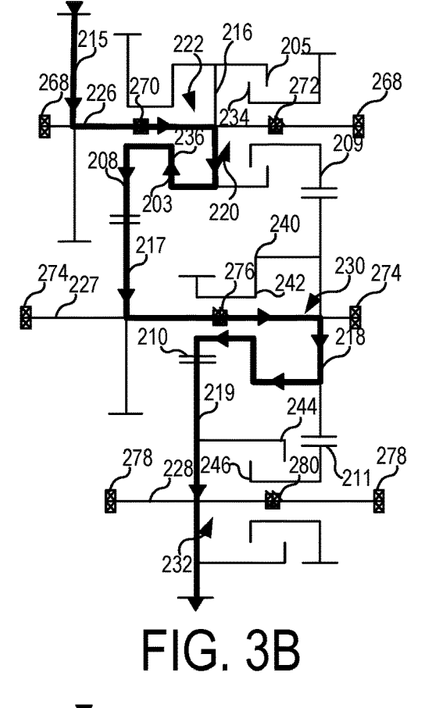
FIG. 3B shows a schematic of the four speed transmission system in a second gear/clutch ratio and a power path thereof.
Figure 3C:
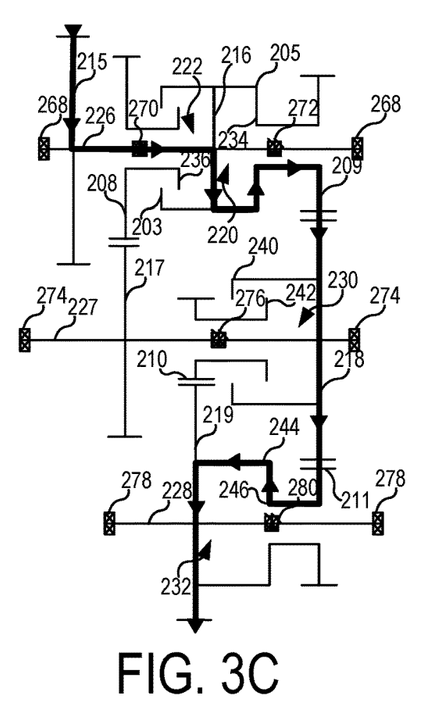
FIG. 3C shows a schematic of the four speed transmission system in a third gear/clutch ratio and a power path thereof.
Figure 3D:
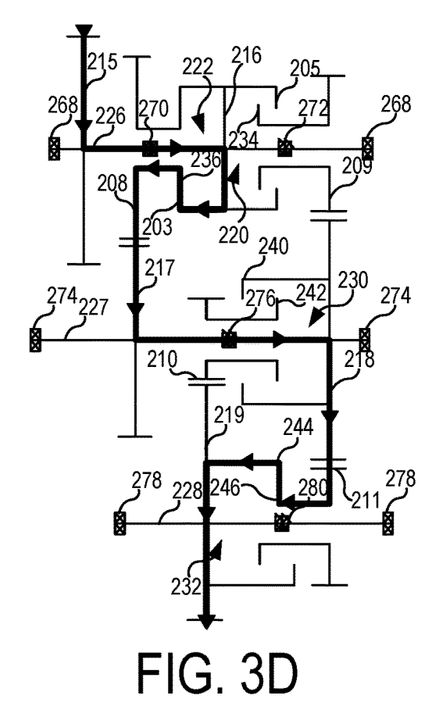
FIG. 3D shows a schematic of the four speed transmission system in a fourth gear/clutch ratio and a power path thereof.

Turning now to FIGS. 3A-D, power paths for each of four gear/clutch ratios for a transmission system are provided. The transmission system depicted in FIGS. 3A-D may be the transmission system 200 of FIG. 2A. FIG. 3A depicts a power path for the first configuration of the system. FIG. 3B depicts a power path for the second configuration of the system. FIG. 3C depicts a power path for the third configuration of the system. FIG. 3D depicts a power path for the fourth configuration of the system. Components therein are numbered similarly to FIG. 2A for consistency. In each of the four configurations of the system, power is transferred from the electric motor 202 (and the second electric motor 282 in such embodiments that include a second electric motor) through the first input speed reduction gear set 204 and into the input shaft 225. From the input shaft 225, power is transferred into gear 214 and then into gear 215. Electric motor 202, the first input speed reduction gear set 204, input shaft 225, and gear 214 are not explicitly shown in FIGS. 3A-D. Additionally, after traveling through the engaged clutches and relevant gears and shafts, power is transferred into gear 229 from gear 219. From gear 229, power travels into the shaft 228 and to the output interfaces 260, which may transfer rotational power downstream. Gear 229, output shaft 238, and output interfaces 260 are not explicitly shown in FIGS. 3A-D.

During conditions of the first configuration of the system in which the multi-range clutch 207 is in the first position 220 and the low-speed clutch 230 is engaged, gear 216 may be coupled to gear 218 via gear 209 when clutch plates 205 and 234 are engaged. The low-speed clutch 230 is fixedly coupled to gear 218 and may also be coupled to gear 219 via gear 210 when clutch plates 240 and 242 are engaged. From gear 215, power moves into shaft 226 and is then transferred to gear 216. From gear 216, power moves through engaged clutch plates 205 and 234 and into gear 209. From gear 209, the power path travels into gear 218 and into the low-speed clutch 230, moving through engaged clutch plates 240 and 242 and into gear 210. From gear 210, the power path travels into gear 219, and then travels downstream towards the output interfaces 260 as described above.

During conditions of the second configuration of the system in which the multi-range clutch 207 is in the second position 222 and the low-speed clutch 230 is engaged, gear 216 may be coupled to gear 217 via gear 208 when clutch plates 203 and 236 are engaged. Gear 217 is coupled to shaft 227, which is further coupled to gear 218. The low-speed clutch 230 is fixedly coupled to gear 218 and may also be coupled to gear 219 via gear 210 when clutch plates 240 and 242 are engaged. Gear 210 is further coupled to gear 219. From gear 215, the power path travels into shaft 226 and then into gear 216. From gear 216, power moves through engaged clutch plates 203 and 236 and into gear 208. From gear 208, the power path travels into gear 217, into shaft 227, and into gear 218. From gear 218, power travels into the low-speed clutch 230, moving through engaged clutch plates 240 and 242 and into gear 210. From gear 210, the power path travels into gear 219, and then travels downstream towards the output interfaces 260 as described above.

During conditions of the third configuration of the system in which the multi-range clutch 207 is in the first position 220 and the high-speed clutch 232 is engaged, gear 216 may be coupled to gear 218 via gear 209 when clutch plates 205 and 234 are engaged. The high-speed clutch 232 is fixedly coupled to gear 219 and may also be coupled to gear 218 via gear 211 when clutch plates 244 and 246 are engaged. From gear 215, power moves into shaft 226 and is then transferred to gear 216. From gear 216, power moves through engaged clutch plates 205 and 234 and into gear 209. From gear 209, the power path travels into gear 218 and into the high-speed clutch 232 via gear 211. From gear 211, power travels through engaged clutch plates 244 and 246 and into gear 219.

During conditions of the fourth configuration of the system in which the multi-range clutch 207 is in the second position 222 and the high-speed clutch 232 is engaged, gear 216 may be coupled to gear 217 via gear 208 when clutch plates 203 and 236 are engaged. Gear 217 is coupled to shaft 227, which is further coupled to gear 218. The high-speed clutch 232 is fixedly coupled to gear 219 and may also be coupled to gear 218 via gear 211 when clutch plates 244 and 246 are engaged. From gear 215, the power path travels into shaft 226 and then into gear 216. From gear 216, power moves through engaged clutch plates 203 and 236 and into gear 208. From gear 208, the power path travels into gear 217, into shaft 227, and into gear 218. From gear 218, power travels into the high-speed clutch 232 via gear 211. Power moves through engaged clutch plates 244 and 246 and into gear 219.

As described previously, the low-speed clutch 230 and the high-speed clutch 232 double the number of total speeds of the transmission system 200. In one embodiment, there may be two initial speeds from the multi-range clutch (e.g., first position 220 and second position 222). The sequence of clutches and gears aforedescribed allow for reduced spread of the range clutches while doubling the number of speeds available. Advantageously, this four speed layout is relatively small and may be able to be used in specific applications that demand a small envelope for the transmission. Further, when oriented in a vehicle, the architecture may enable a top of the motor(s) driving the transmission to be below a top of the transmission housing and for the output interfaces to be spaced away from the motor(s) to better fit a desired vehicle envelope.

As stated previously, there may be a controller 112 with instructions stored therein to operate the multi-ratio gearbox with the motor turning in a first forward direction with each of four different gear ratios including with: (1) the multi-range clutch in the first position (e.g., first position 220), the low-speed clutch 230 engaged, and the high-speed clutch 232 disengaged, (2) the multi-range clutch in a second position (e.g., second position 222), the low-speed clutch 230 engaged, and the high-speed clutch 232 disengaged, (3) the multi-range clutch in the first position (e.g., the first position 220), the low-speed clutch 230 disengaged, and the high-speed clutch 232 engaged, and (4) the multi-range clutch in the second position (e.g., the second position 222), the low-speed clutch 230 disengaged, and the high-speed clutch 232 engaged. The controller 112 may also have instructions to further operate the multi-ratio gearbox with the motor turning in a second reverse direction with each of the four gear ratios, wherein the multi-ratio gearbox does not reverse rotation via any of the multi-range clutch, the low-speed clutch, and the high-speed clutch.

In an example, the transmission described herein may have exactly four gear ratios in each of the forward and reverse directions.

Figure 4:
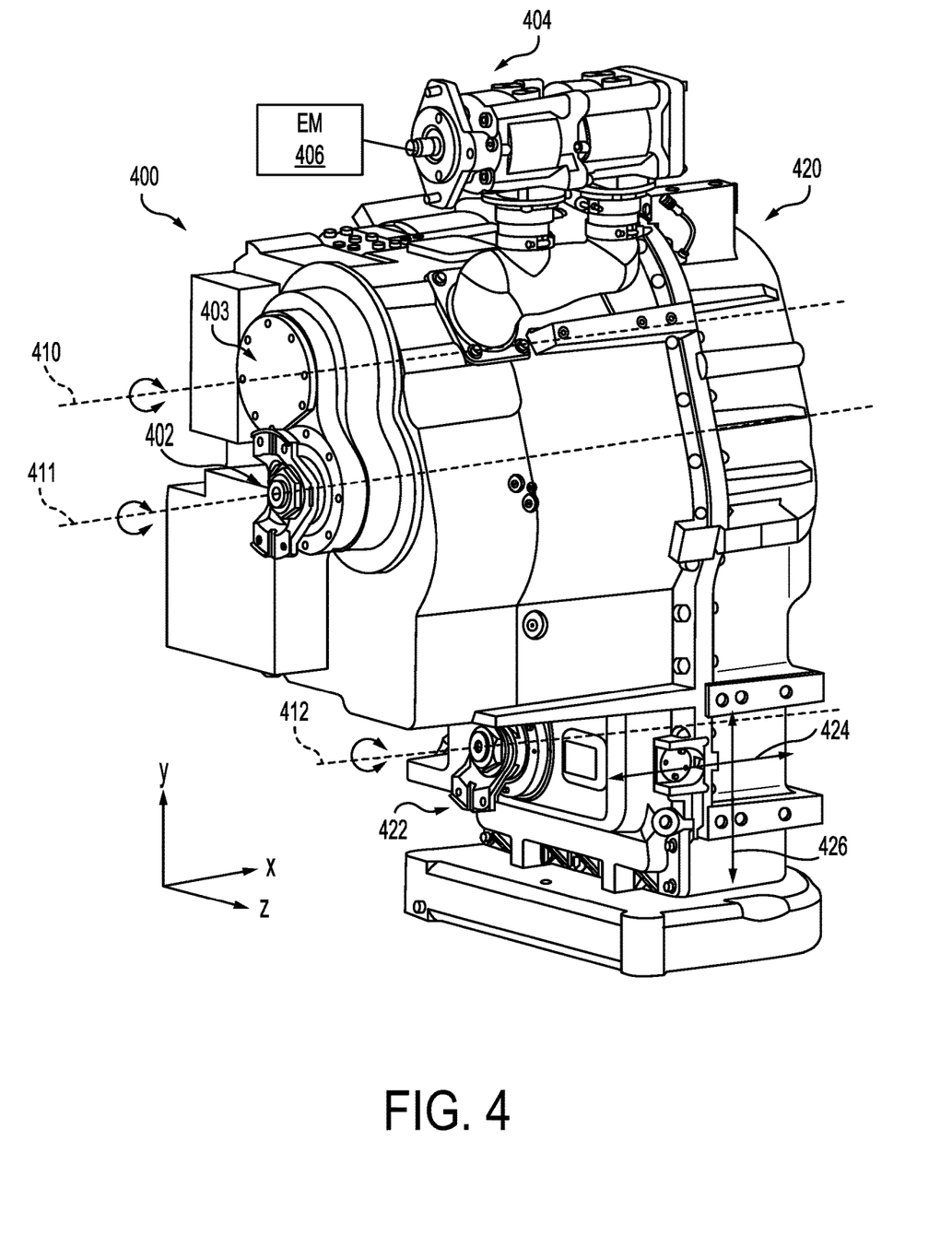
FIG. 4 shows a detailed schematic of a transmission housing for the four speed transmission system.

Turning now to FIG. 4, an example of a transmission housing 400 is shown. FIG. 4 is drawn to scale, although other relative dimensions may be used, if desired. The transmission system 200 of FIG. 2A may be housed inside the transmission housing 400. The transmission housing 400 comprises an upper section 420 and a lower section 422. The upper section 420 of the transmission housing 400 may house each of the first, second, and third sections of the multi-ratio gear box described with reference to FIG. 2A. The lower section 422 of the transmission housing 400 may house the output shaft 238 and the gear 229, which are spaced away from the first, second, and third sections.

In some embodiments, the electric motor 202 may be housed inside a motor housing (not pictured) coupled to the transmission housing 400. The transmission system 200, electric motor 202, and the control system 114 are not visible from the view of the transmission housing 400 shown in FIG. 4. An offset box 402 may allow the drive motor (e.g., electric motor 202) to be inputted into the transmission system 200. The relative positioning of the electric motor 202 and the transmission system 200 may be such that the electric motor 202 and its motor housing (not pictured) are installed to the transmission system 200 in a position not exceeding the highest point of the transmission system 200 and the transmission housing 400. The electric motor 202 being arranged below the highest point of the transmission may allow for one or more input speed reduction gear sets. These input speed reduction gear sets may reduce torque loads throughout the multi-ratio gear box and allow for larger sized bearings, as previously described. The electric motor 202 being arranged below the highest point of the transmission system 200 may also reduce the overall required size of the transmission housing. The transmission housing 400 may also contain a gear set to match the maximum electric motor 202 speed to the maximum transmission system 200 input speed.

The gear 229 and the output shaft 238 may be configured to fit within dimensions of the lower section 422 of the transmission housing 400. For example, a diameter of the gear 229 may be configured to fit within a height 426 of the lower section 422. A width of the output shaft 238, and thus the distance between the output interfaces 260, may be configured to fit within a width 424 of the lower section 422. The width 424 may be shorter than compared to a width of the upper section 420 and may be shorter than a width of the shaft 228, as the shaft 228 directly couples to the high-speed clutch 232 and the output shaft 238 does not directly couple to a clutch. The reduced width of the output shaft 238 may allow for the transmission system 200 to be installed into vehicle platforms that demand short distances between output interfaces.

Additionally, another input may provide an option of coupling the second electric motor 282 to the transmission housing via offset box 403. Horizontal axis 410, horizontal axis 411, and horizontal axis 412 are depicted in FIG. 4 as well. Horizontal axis 410 may correspond to the horizontal axis of the shaft 284 that the second electric motor 282 couples to. Horizontal axis 411 may correspond to the horizontal axis of shaft 224 that the electric motor 202 couples to. Horizontal axis 412 may correspond to the horizontal axis of the fifth shaft of the multi-ratio gear box (e.g., output shaft 238). Horizontal axes 410, 411, and 412 may all be parallel to each other.

Further, a charging pump 404 may be coupled directly to the vertical top of transmission housing 400, in such that the charging pump 404 and the transmission housing 400 are in face sharing contact. In some embodiments, the charging pump 404 may be driven by an electric motor 406. In one embodiment, electric motor 406 may be an electric pump motor, separate from an electric traction motor powering the transmission components (e.g., electric motor 202). The charging pump 404 may be detachable. As an option, the charging pump 404 may be detached from the transmission system 200 insofar that the charging pump 404 and the electric motor 406 that drives the charging pump 404 are in a remote location and connected to the transmission housing 400 via input and output hoses (not pictured). The option to be able to keep the charging pump 404 directly on the transmission housing 400 further reduces the size of the system which may decrease the needed size of the envelope for the transmission, and/or may allow for more precise control of transmission hydraulic pressures, which in turn can increase shift control.

Figure 5:
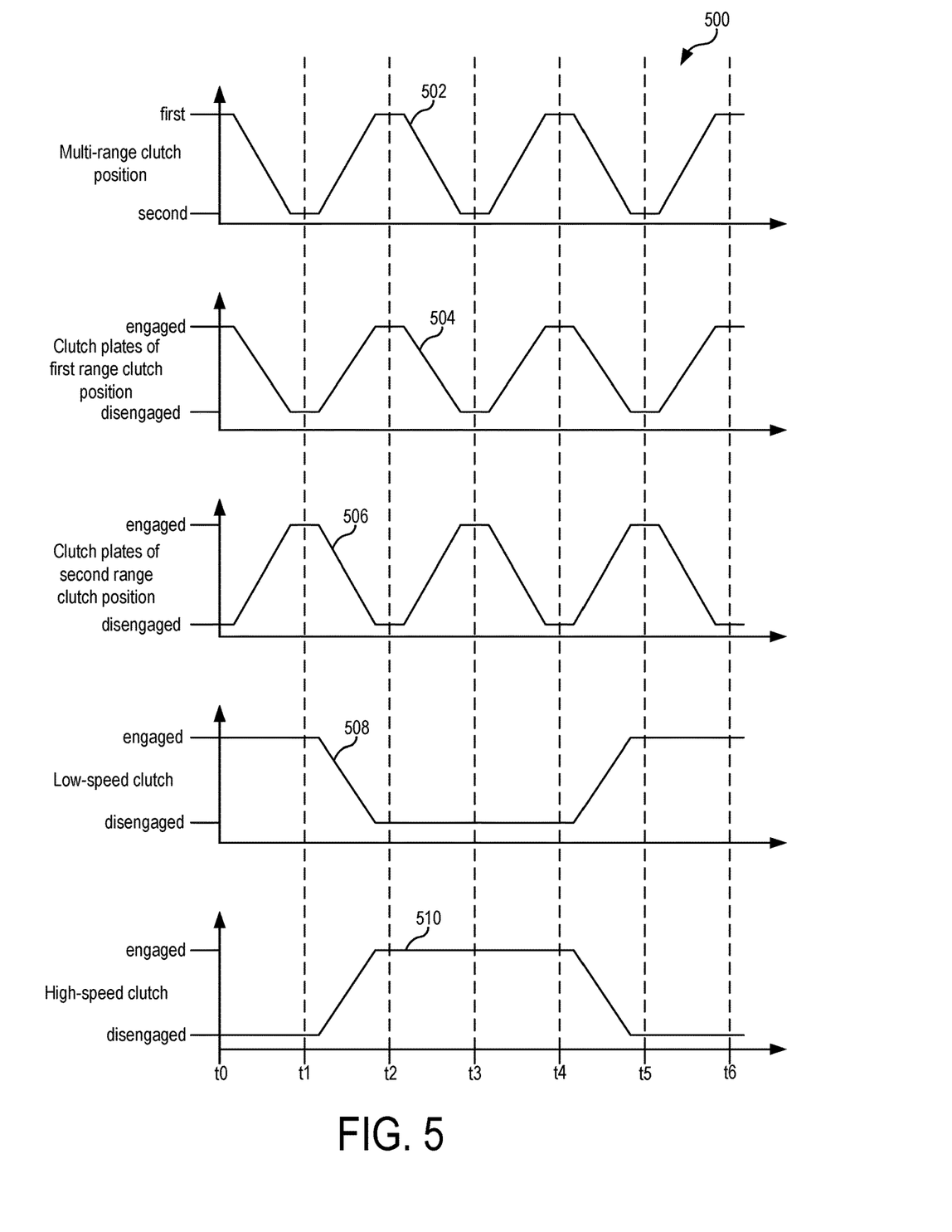
FIG. 5 shows a timing diagram of a use-case scenario for the four speed transmission system.

Referring now to FIG. 5, a use-case scenario for a transmission system is illustrated in a timing diagram 500. The transmission system may be the transmission system 200 of FIG. 2A. In each graph, time is indicated on the abscissa and increases from left to right. The ordinate for plot 502 indicates a position of a multi-range clutch ("first position" or "second position"). The first position of the multi-range clutch may be the first position 220 of multi-range clutch 207. The second position of the multi-range clutch may be the second position 222. The ordinate for plot 504 indicates an operational state of clutch plates of the first position of the multi-range clutch ("Engaged" or "Disengaged"). The ordinate for plot 506 indicates an operational state of clutch plates of the second position of the multi-range clutch ("Engaged" or "Disengaged"). The ordinate for plot 508 indicates operational state of the low-speed clutch ("Engaged" or "Disengaged"). The ordinate for plot 510 indicates operational state of the high-speed clutch ("Engaged" or "Disengaged"). Engaged indicates that the respective clutch permits rotational energy transfer therethrough and disengaged denotes that rotational energy transfer through the clutch is inhibited.

At t0, the multi-range clutch is in the first position, and thus the clutch plates of the first position are engaged while the clutch plates of the second position are disengaged. The low-speed clutch is engaged while the high-speed clutch is disengaged. TO may represent operational states of clutches in the first configuration of the transmission system. Between t0 and t1, clutch plates of the first position transition from engaged to disengaged at the same time as clutch plates of the second position transition from disengaged to engaged. Consequently, the multi-range clutch position transitions from the first position to the second position. T1 may represent operational states of clutches in the second configuration of the transmission system.

Between t1 and t2, the clutch plates of the first position transition from disengaged to engaged at the same time as the clutch plates of the second position transition from engaged to disengaged. Consequently, the multi-range clutch position transitions from the second position to the first position. The low-speed clutch also transitions from engaged to disengaged at the same time as the high-speed clutch transitions from disengaged to engaged. T2 may represent operational states of clutches in the third configuration of the transmission.

Between t2 and t3, clutch plates of the first position transition from engaged to disengaged at the same time as clutch plates of the second position transition from disengaged to engaged. Consequently, the multi-range clutch position transitions from the first position to the second position. The low-speed clutch remains disengaged and the high-speed clutch remains engaged. T3 may represent operational states of clutches in the fourth configuration of the transmission system.

Between t3 and t4, the clutch plates of the first position transition from disengaged to engaged at the same time as the clutch plates of the second position transition from engaged to disengaged. Consequently, the multi-range clutch position transitions from the second position to the first position. The low-speed clutch remains disengaged and the high-speed clutch remains engaged. T4 may represent operational states of clutches in the third configuration of the transmission.

Between t4 and t5, clutch plates of the first position transition from engaged to disengaged at the same time as clutch plates of the second position transition from disengaged to engaged. Consequently, the multi-range clutch position transitions from the first position to the second position. The high-speed clutch also transitions from engaged to disengaged at the same time as the low-speed clutch transitions from disengaged to engaged. T5 may represent operational states of clutches in the second configuration of the transmission system.

Between t5 and t6, the clutch plates of the first position transition from disengaged to engaged at the same time as the clutch plates of the second position transition from engaged to disengaged. Consequently, the multi-range clutch position transitions from the second position to the first position. The low-speed clutch remains engaged and the high-speed clutch remains disengaged. T6 may represent operational states of clutches in the first configuration of the transmission.

Time between t0 and t1, t1 and t2, and t2 and t3 may represent upshifting transients between gear/clutch ratios. Conversely, time between t3 and t4, t4 and t5, and t5 and t6 may represent downshifting transients between gear/clutch ratios. Other or additional upshifting and downshifting transients may be possible that are not depicted in timing diagram 500. For example, a downshift variant from the fourth configuration to the second configuration may be achieved by transitioning the high-speed clutch from engaged to disengaged at the same time as transitioning the low-speed clutch from disengaged to engaged.

Transition between operational states of the clutches herein described may be controlled via actuators and sensors of a control system, such as control system 114 of FIG. 1. Transition from an engaged state to a disengaged state, for any of the plots 504, 506, 508, and/or 510 may include decreasing pressure on clutch plates. Transition from the disengaged state to the engaged state may include increasing pressure on clutch plates. When transitioning between the first position and the second position, or vice versa, of the multi-range clutch, pressure on one set of clutch plates is decreased at the same time as pressure on the other set of clutch plates is increased. Similarly, transitions between high-speed clutch and low-speed clutch may include increasing pressure in one of the clutches at the same time as decreasing pressure in the other of the clutches. An overlapping shifting method such as this may increase smoothness of shifts between ratios and reducing interruptions during shifting.

The disclosure also provides support for a system for a multi-ratio gearbox, comprising: a first shaft coupled to one or more input speed reduction gear sets, a second shaft coupled to a multi-range clutch, the multi-range clutch comprising a first position and a second position, a third shaft coupled to a low-speed clutch, a fourth shaft coupled to a high-speed clutch, and a fifth shaft coupled to the fourth shaft via a gear of a plurality of gears. In a first example of the system, the first shaft is an input shaft. In a second example of the system, optionally including the first example, the fifth shaft is an output shaft. In a third example of the system, optionally including one or both of the first and second examples, the second, third, and fourth shafts are layshafts. In a fourth example of the system, optionally including one or more or each of the first through third examples, the first, second, third, fourth, and fifth shafts are parallel to each other. In a fifth example of the system, optionally including one or more or each of the first through fourth examples, the fifth shaft is positioned vertically below the first, second, third, and fourth shafts with respect to gravity. In a sixth example of the system, optionally including one or more or each of the first through fifth examples, the multi-range clutch includes the first position coupling the second shaft to the third shaft via a low gear and the second position coupling the second shaft to the third shaft via a high gear. In a seventh example of the system, optionally including one or more or each of the first through sixth examples, the fifth shaft is spaced away from the fourth shaft via the gear that couples the fifth shaft to the fourth shaft. In a eighth example of the system, optionally including one or more or each of the first through seventh examples, the fifth shaft couples to two output interfaces, a distance between the two output interfaces being short.

The disclosure also provides support for a multi-speed transmission, comprising: a first electric motor coupled to an input side of a first shaft of a plurality of shafts, a multi-range clutch coupled to a second shaft of the plurality of shafts, the multi-range clutch including a first position and second position, a low-speed clutch coupled to a third shaft of the plurality of shafts, a high-speed clutch coupled to a fourth shaft of the plurality of shafts, and a controller with instructions stored therein to operate the multi-speed transmission with the first electric motor turning in a first forward direction with each of four gear ratios including with: (1) the multi-range clutch in the first position, the low-speed clutch engaged, and the high-speed clutch disengaged, (2) the multi-range clutch in the second position, the low-speed clutch engaged, and the high-speed clutch disengaged, (3) the multi-range clutch in the first position, the low-speed clutch disengaged, and the high-speed clutch engaged, and (4) the multi-range clutch in the second position, the low-speed clutch disengaged, and the high-speed clutch engaged, and the instructions further operate the multi-speed transmission with the first electric motor turning in a second reverse direction with each of the four gear ratios, wherein the multi-speed transmission does not reverse rotation via any of the multi-range clutch, the low-speed clutch, and the high-speed clutch. In a first example of the system, the system further comprises: a charging pump coupled directly to a housing of the multi-speed transmission. In a second example of the system, optionally including the first example, the system further comprises: a pump motor coupled to the charging pump, the pump motor coupled directly to the housing. In a third example of the system, optionally including one or both of the first and second examples, the system further comprises: the first electric motor and a second electric motor coupled to the input side of the first shaft. In a fourth example of the system, optionally including one or more or each of the first through third examples, the first electric motor and the second electric motor are coupled to the input side of the first shaft via different gear ratios.

The disclosure also provides support for a system, comprising: a countershaft power-shift transmission having an input, a transmission housed in a transmission housing, an electric traction motor coupled to the input, the electric traction motor housed in a motor housing, wherein a vertical top of the motor housing is below a top of the transmission housing, and a distance between output interfaces of the transmission configured to fit within a lower section of the transmission housing. In a first example of the system, the countershaft power-shift transmission is a four speed transmission including a first shaft coupled to one or more input speed reduction gear sets, a second shaft coupled to a multi-range clutch, a third shaft coupled to a low-speed clutch, a fourth shaft coupled to a high-speed clutch, and a fifth shaft coupled to the output interfaces and to the fourth shaft. In a second example of the system, optionally including the first example, the fifth shaft is an output shaft. In a third example of the system, optionally including one or both of the first and second examples, a gear of a plurality of gears couples the fifth shaft to the fourth shaft, the gear being configured with a size configured to fit within a height of the lower section of the transmission. In a fourth example of the system, optionally including one or more or each of the first through third examples, the system further comprises: another electric traction motor coupled to another input of the countershaft power-shift transmission. In a fifth example of the system, optionally including one or more or each of the first through fourth examples, the first, second, third, fourth, and fifth shafts are all arranged parallel to one another and wherein the first shaft is vertically above the second shaft, the second shaft is vertically above the third shaft, the third shaft is vertically above the fourth shaft, and the fourth shaft is vertically above the fifth shaft when arranged in a vehicle.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a multi-ratio gearbox, comprising:
   a first shaft coupled to a first input speed reduction gear set and a second input speed reduction gear set;
   a second shaft coupled to a multi-range clutch and the second input speed reduction gear set, the multi-range clutch comprising a first position and a second position;
   a third shaft coupled to a low-speed clutch;
   a fourth shaft coupled to a high-speed clutch;
   a fifth shaft coupled to the fourth shaft via a gear of a plurality of gears; and
   an electric motor coupled to the first shaft via a rotor shaft, wherein the rotor shaft is positioned vertically below the first shaft and couples directly to the first input speed reduction gear set.

2. The system of claim 1, further comprising a second electric motor coupled to the first shaft via a second rotor shaft, wherein the second rotor shaft is positioned vertically above the first shaft and couples directly to the first input speed reduction gear set.

3. The system of claim 1, wherein the fifth shaft is an output shaft.

4. The system of claim 1, further comprising a controller configured with instructions stored therein to operate the system with the electric motor turning in a first forward direction wherein each of four gear ratios of the system include: (1) the multi-range clutch in the first position, the low-speed clutch engaged, and the high-speed clutch disengaged, (2) the multi-range clutch in the second position, the low-speed clutch engaged, and the high-speed clutch disengaged, (3) the multi-range clutch in the first position, the low-speed clutch disengaged, and the high-speed clutch engaged, and (4) the multi-range clutch in the second position, the low-speed clutch disengaged, and the high-speed clutch engaged; and the controller further configured to operate the system with the electric motor turning in a second reverse direction with each of the four gear ratios.

5. The system of claim 1, further comprising a housing in which the multi-ratio gear box is housed, wherein the housing comprises an upper section and a lower section, and wherein the first, second, third, and fourth shafts are housed within the upper section and the fifth shaft is housed within the lower section.

6. The system of claim 1, wherein the fifth shaft is positioned vertically below the first, second, third, and fourth shafts with respect to gravity.

7. The system of claim 1, wherein the multi-range clutch includes the first position coupling the second shaft to the third shaft via a low gear and the second position coupling the second shaft to the third shaft via a high gear.

8. The system of claim 1, wherein the fifth shaft is spaced away from the fourth shaft via the gear that couples the fifth shaft to the fourth shaft.

9. The system of claim 1, wherein the fifth shaft couples to two output interfaces, a width between the two output interfaces being shorter than a width of the fourth shaft.

10. A multi-speed transmission, comprising:
a first electric motor coupled to an input side of a first shaft of a plurality of shafts;
a multi-range clutch coupled to a second shaft of the plurality of shafts, the multi-range clutch including a first position and second position;
a low-speed clutch coupled to a third shaft of the plurality of shafts;
a high-speed clutch coupled to a fourth shaft of the plurality of shafts; and
a controller with instructions stored therein to operate the multi-speed transmission with the first electric motor turning in a first forward direction, wherein four gear ratios of the multi-speed transmission include: (1) the multi-range clutch in the first position, the low-speed clutch engaged, and the high-speed clutch disengaged, (2) the multi-range clutch in the second position, the low-speed clutch engaged, and the high-speed clutch disengaged, (3) the multi-range clutch in the first position, the low-speed clutch disengaged, and the high-speed clutch engaged, and (4) the multi-range clutch in the second position, the low-speed clutch disengaged, and the high-speed clutch engaged; and the instructions further operate the multi-speed transmission with the first electric motor turning in a second reverse direction with each of the four gear ratios, wherein the multi-speed transmission does not reverse rotation via any of the multi-range clutch, the low-speed clutch, and the high-speed clutch when the first electric motor is turning in the second reverse direction.

11. The multi-speed transmission of claim 10, further comprising a charging pump coupled directly to a housing of the multi-speed transmission.

12. The multi-speed transmission of claim 11, further comprising a pump motor coupled to the charging pump, the pump motor coupled directly to the housing.

13. The multi-speed transmission of claim 10, further comprising the first electric motor and a second electric motor coupled to the input side of the first shaft.

14. The multi-speed transmission of claim 13, wherein the first electric motor and the second electric motor are coupled to the input side of the first shaft via different gear ratios.

15. A system, comprising:
a countershaft power-shift transmission having an input shaft and an output shaft, wherein the output shaft does not have a clutch positioned thereon;
a transmission housing in which the countershaft power-shift transmission is housed, wherein the transmission housing comprises an upper section in which the input shaft is positioned and a lower section in which the output shaft is positioned;
an electric traction motor coupled to the input shaft via a first input speed reduction gear set coupled directly to a rotor shaft of the electric traction motor, the electric traction motor housed in a motor housing, wherein a vertical top of the motor housing is below a top of the transmission housing and the upper section is wider than the lower section.

16. The system of claim 15, wherein the countershaft power-shift transmission is a four speed transmission including the input shaft coupled to the first input speed reduction gear set and a second input speed reduction gear set, a second shaft coupled to a multi-range clutch and the second input speed reduction gear set, a third shaft coupled to a low-speed clutch, a fourth shaft coupled to a high-speed clutch, and the output shaft coupled to output interfaces and to the fourth shaft.

17. The system of claim 16, wherein the fifth shaft is an output shaft.

18. The system of claim 16, wherein a gear of a plurality of gears couples the fifth shaft to the fourth shaft, the gear being configured with a size configured to fit within a height of the lower section of the transmission.

19. The system of claim 16, wherein the first, second, third, fourth, and fifth shafts are all arranged parallel to one another and wherein the first shaft is vertically above the second shaft, the second shaft is vertically above the third shaft, the third shaft is vertically above the fourth shaft, and the fourth shaft is vertically above the fifth shaft when arranged in a vehicle.

20. The system of claim 15, further comprising another electric traction motor coupled to the input shaft via the first input speed reduction gear set of the countershaft power-shift transmission, wherein a second rotor shaft of the another electric traction motor is coupled to the first input speed reduction gear set.

* * * * *